April 16, 1957 — E. A. HOEH — 2,788,570
VALVE CLOSURE MEMBER
Filed Aug. 31, 1953
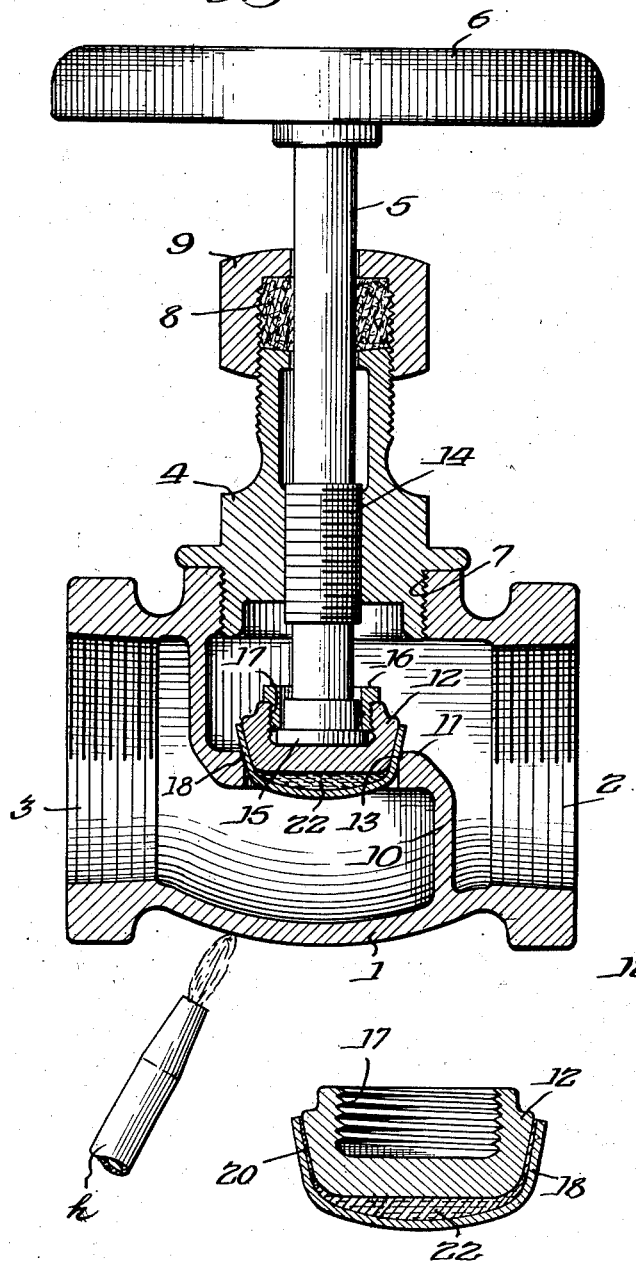
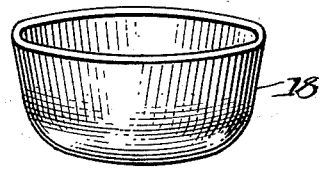
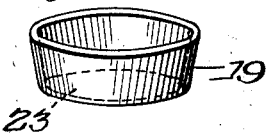
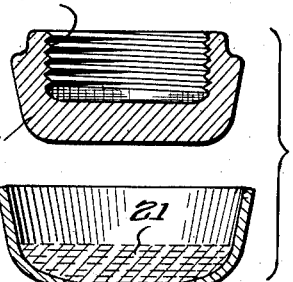
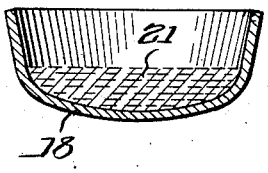
Inventor:
Earl A. Hoeh

2,788,570

VALVE CLOSURE MEMBER

Earl A. Hoeh, Chicago, Ill., assignor to Crane Co., Chicago, Ill., a corporation of Illinois Application August 31, 1953, Serial No. 377,320

2 Claims. (Cl. 29—157.1)

The present invention pertains to valves generally and more especially to a durable seating face therefor which is relatively easily applied to a softer base material of a conventional valve disc or closure member. My invention has particular application to those valves employing a plug-type sealing disc, such as are found in globe valves, but as hereinafter made clear may be used on other forms also.

Heretofore numerous expedients were employed in an effort to negate the costly corrosive and abrasive action continually taking place on the seating surface of a valve disc. The problem of disc wear has increased manifold in magnitude when fluids of a corrosive nature are employed in the pipeline or other service condition.

The use of a seating plate or plates of a resistant metal attached to a backing plate has previously been proposed as a solution to the above problem, but the prior method of attaching the plates to the closure member introduced many serious problems, as, for example, metal lugs which grasped the backing plate had a tendency to loosen with use. Also suggested was the direct application of a durable facing metal to the disc seating surface, but this was accomplished only with great difficulty and expense. Attempts to harden the surfaces of the discs themselves frequently resulted in a lessening of the corrosion resistance of the treated discs.

It is therefore an important object of my invention to provide an annular disc facing or protecting cup of a comparatively simple and inexpensive design to cover the normal seating surface of a valve disc, and in which the disc cup may be easily formed and fastened by a number of simple and effective means to the disc proper.

It is a further object of my invention to provide a method for permanently and accurately attaching the protective face to the valve disc while the disc is preferably in the seated position, thereby assuring an efficient and protective fluid-tight seal during all subsequent valve closure operations.

It is a still further object of my invention to provide a unique method for attaching the protective cup to the valve disc which method consists of fusing or sealing the two closure member components together with molten solder to other suitable hardenable and sealing material by employing the principle of capillary attraction as will hereinafter be described in greater detail.

Other objects and advantages of my invention will become more manifest upon proceeding with the following specification read in light of the accompanying drawings, in which Fig. 1 is a sectional view of a conventional valve embodying my invention.

Fig. 2 is a perspective view of a protective disc cup.

Figs. 3 and 4 are sectional views illustrating the steps in attaching the disc cup to the disc by means of capillary attraction.

Fig. 5 is a perspective view of a modified form embodying a protective disc sleeve.

Similar reference numerals refer to similar parts throughout the several views.

Referring now to Fig. 1, the usual plug-type globe valve is illustrated having the body or casing generally designated 1 with inlet 2 and outlet 3. The bonnet 4 may be threadedly engaged to the body as shown by the threads 7. The stem 5 has the handwheel 6 fixedly attached to its upper extremity. The packing 8 is forced into fluid sealing compactness when the packing nut 9 is rotated on the upper extremity of the bonnet to which it is threadedly engaged. The casing chamber contains the usual integrally formed bridge wall or diaphragm 10 which has the seat 11 integral therewith interposed between the inlet 2 and the outlet 3. The closure member or disc 12 is of a general frusto-conical configuration as depicted and is adapted to engage in a fluid tight manner the seating face 13 of the seat 11 which is chamfered to conform with the disc 12. The angle of chamfer being supplementary to the angle of elevation of the disc sides as seen in Fig. 1, a tight fit is assured on all closure operations. The stem 5 which is engaged to the bonnet 4 by means of threads 14 terminates in a flange or head 15 which engages the disc stem ring 16. The disc or closure member 12 engages the disc stem ring by means of the threads 17 and in doing so becomes subject to the reciprocal movement of the stem 5. The cup facing 18 is shown in its protective capacity between the disc 12 and the seating surface 13.

It should be remembered that although a globe valve is depicted utilizing my invention, the closure member or disc of any type valve which has need for a durable protective surface may employ my invention to advantage. It should also be understood that a multitude of methods, such as welding, brazing, spinning, etc., may be used in attaching the protective cup 18 to the disc 12 without departing from the spirit of the invention.

The essence of my invention which comprises the protective cup or face 18 and which surrounds the plug disc 12 is made of durable material, such as a cobalt chromium-alloy commercially known as Stellite. The beveled or chamfered surface 13 of the seat 11 has an angle of elevation which is supplementary to that of the tapered sides of the protective cup 18. It will be further noted that the seating torque transmitted through the stem 5 forces the assembled plug disc 12 and protective cup 18 into a firm and more intimate contact as the seating takes place, as may be clearly seen in Fig. 1, thus negating the possibility of the two closure member components becoming loosened or separated in the course of valve operation. In addition, it will be appreciated that since the cup surrounds the disc 12 on the bottom surface also, overall protection is afforded the plug not only from seat wear but from the action of any fluids which may impinge against the bottom of the cup 18, especially where considerable backflow occurs in the pipeline.

It should be noted, however, that where the impinging of fluids against the bottom of the disc is minor or of no real consequence the modified protective sleeve 19 illustrated in Fig. 5 will work with an effectiveness equal to that of cup 18.

The sleeve 19 covers a segment of the disc which is usually intermediate the two disc end limits. This protected surface includes, of course, the disc segment normally in contact with the seating surface, assuring a durable closure member seating surface. The life span of a disc employing such a sleeve will thus greatly exceed that of the normal unprotected disc.

An efficient seat conforming positioning of the sleeve 19 may be assured by coating the inner surface of the sleeve with a suitable hardenable cementing material, assembling the sleeved closure member in the valve in the normal seated position and allowing the cementing material to harden with the sleeve, disc, and seat in the proper relationship.

In explanation of the capillary attraction method of protective cup attachment, reference is now made to Figs. 3 and 4 which depict this simple but effective manner for attaching the protective cup 18 to the disc 12.

Referring to Fig. 3, the disc cup 18 is shown with a measured quantity of molten solder 21 therein with the disc 12 suitably threaded as at 17 positioned above ready for insertion in the cup. The volume of solder 21 deposited in the cup 18 must be sufficient to enable the plug 12 to displace an amount of the solder which will in turn effect a rise in the pool height enabling the molten solder to reach the cup-disc interface. At such interface 20 of Fig 4, capillary attraction enables the solder to continue up the minute spaces or passageways between the disc and cup walls effecting an efficient permanent seal.

Fig. 4 illustrates the cross section of disc cup 12 joined to the disc 6 by utilizing the capillary attraction method.

It will be noted from Figs. 2 and 3 that the cup 12 has a rounded bottom of predetermined radius assuring a well or reservoir 22 for molten solder in the cup bottom between the straight bottom of the plug 12 and the curved inner bottom surface of the cup 18.

The protective cup 18 may be repositioned relative to the disc 12 while the valve is in the normally closed position as depicted in Fig. 1. The advantage of this process is obvious; since the protective sealing cup may be properly adjusted to the exact sealing conformation of the valve seat 11, an efficient fluid-tight valve closure position is assured.

The process comprises the following steps. After the cup 18 has been initially affixed to the disc 12, the valve components are assembled and heat from a source designated $h$ in Fig. 1 is externally applied to the valve casing. Simultaneously, a seating torque is applied to the handle 5. The solder having a low melting point will readily become plastic enabling the cup 18 to assume a proper, efficient sealing relationship with the casing seat 11. The heat source is then removed and the solder is allowed to harden after this new positioning of closure member components has been assumed.

The working flexibility afforded valves employing my invention is obvious. The protective cups or sleeves may be composed of any desirable materials to resist the corrosive action of whatever fluids may be carried in the line and to insure durable seat wear. The selection of sealing material similarly is also open to the discretion of the valve employer. In addition to sealing solder, a large number of resistant adhesives may be employed to suit the individual needs of the user. Employing my method of repositioning of the protective cup or sleeve minor seating machining inaccuracies may be eliminated by permanently attaching the cup disc or sleeve and disc while the valve is in the normally closed position, thus assuring a proper closure in all subsequent operations.

It is obvious from the above description that varied methods of utilization of the basic principles comprising the essence of my discovery may be effected and remain within the province of my invention as determined by the appended claims.

I claim:

1. In a method for effecting a proper fluid-sealing relationship in a valve or the like between a disc closure member and a seat therefor with an interposed preformed facing for receiving said disc closure member, said method comprising the steps of initially securing said disc closure and said preformed facing together by means of a relatively low melting substance, assembling said disc closure member and said preformed facing with the remainder of said valve, adjusting said valve to the normally closed position, heating said valve until said low-melting securing substance assumes a plastic, or fluid state, allowing said preformed facing to assume a proper fluid sealing relationship with the said seat and allowing said securing substance to harden while said valve closure member is in said normally closed position.

2. In a method for effecting a proper fluid-sealing relationship in a valve or the like between a disc closure member and a seat therefor with an interposed preformed facing for receiving said disc closure member, said method comprising the steps of initially securing said disc closure and said preformed facing together by means of a relatively low melting substance, assembling said disc closure member and said preformed facing with the remainder of said valve, then moving the said closure member predeterminately relative to the said facing and adjusting the valve to its normally closed and seated position, heating said valve until said low-melting securing substance assumes a flowable state, allowing said preformed facing to maintain a fluid sealing relationship with the said seat and allowing said securing substance to take a final fixed position therebetween while said valve closure member is in the normally closed and seated position of the valve.

References Cited in the file of this patent

UNITED STATES PATENTS

| | | |
|---|---|---|
| 1,667,999 | Appleton | May 1, 1928 |
| 1,952,726 | O'Malley | Mar. 27, 1934 |
| 2,327,437 | Kronquest | Aug. 24, 1943 |
| 2,418,447 | Arbogast | Apr. 8, 1947 |

FOREIGN PATENTS

| | | |
|---|---|---|
| 12,461 | Great Britain | of 1904 |